United States Patent
Chang

(10) Patent No.: US 9,849,841 B1
(45) Date of Patent: Dec. 26, 2017

(54) VEHICLE-MOUNTED ELECTRONIC APPARATUS

(71) Applicant: JET OPTOELECTRONICS CO., LTD, Taipei (TW)

(72) Inventor: Yung-Tse Chang, Taipei (TW)

(73) Assignee: JET OPTOELECTRONICS CO., LTD, Taipei (TW)

( * ) Notice: Subject to any disclaimer, the term of this patent is extended or adjusted under 35 U.S.C. 154(b) by 0 days.

(21) Appl. No.: 15/191,386

(22) Filed: Jun. 23, 2016

(51) Int. Cl.
*B60R 11/02* (2006.01)
*B60R 11/00* (2006.01)

(52) U.S. Cl.
CPC ......... *B60R 11/02* (2013.01); *B60R 2011/007* (2013.01); *B60R 2011/0017* (2013.01); *B60R 2011/0071* (2013.01)

(58) Field of Classification Search
CPC .... B60R 7/043; B60R 2011/0012–2011/0017; B60R 2011/0276; B60N 3/004
USPC ........................................................ 224/275
See application file for complete search history.

(56) References Cited

U.S. PATENT DOCUMENTS

| | | | | |
|---|---|---|---|---|
| 6,231,017 B1 * | 5/2001 | Watkins | ............... | B60N 2/4876 224/564 |
| 6,669,285 B1 * | 12/2003 | Park | ..................... | B60N 2/4876 297/217.3 |
| 6,698,832 B2 * | 3/2004 | Boudinot | ............ | B60N 2/4876 297/217.4 |
| 6,739,654 B1 * | 5/2004 | Shen | ..................... | B60N 2/4876 297/188.04 |
| 6,758,521 B2 * | 7/2004 | Imamura | .................. | B60N 2/44 248/919 |
| 6,956,628 B2 * | 10/2005 | Huang | ................ | B60R 11/0235 349/149 |
| 7,665,642 B2 * | 2/2010 | Abbate | ..................... | A45C 9/00 224/153 |
| 7,866,746 B2 * | 1/2011 | Watanabe | ........... | B60R 11/0235 297/188.04 |
| 8,561,863 B2 * | 10/2013 | LaColla | .................. | B60R 11/02 224/275 |
| 8,789,887 B2 * | 7/2014 | Kyogoku | ............. | B60N 2/3038 297/1 |
| 2001/0011664 A1 * | 8/2001 | Meritt | ..................... | B60R 11/02 224/275 |

(Continued)

*Primary Examiner* — Brian D Nash
(74) *Attorney, Agent, or Firm* — WPAT, P.C., Intellectual Property Attorneys; Anthony King

(57) ABSTRACT

A vehicle-mounted electronic apparatus includes a holder, a casing, and a remote control. The casing is connected to the holder and the casing includes a back surface, a side surface, a containing groove, and at least one magnet. The containing groove is formed on the back surface and adjacent to the side surface for containing the remote control. The at least one magnet is disposed in the casing and exposed from at least one through hole. At least one magnetic element is disposed on a side wall of the remote control and magnetically attracted by the at least one magnet. Accordingly, the containing groove is used to conveniently contain the remote control with less occupied space. The at least one magnet provides the magnetic force to attract the at least one magnetic element of the remote control to prevent disengagement caused by vibration or shake on the moving vehicle.

12 Claims, 5 Drawing Sheets

(56) References Cited

U.S. PATENT DOCUMENTS

| | | | |
|---|---|---|---|
| 2003/0057749 A1* | 3/2003 | Buono | B60N 2/44 297/217.3 |
| 2003/0226148 A1* | 12/2003 | Ferguson | B60R 11/0211 725/75 |
| 2005/0011920 A1* | 1/2005 | Feng | B60R 7/043 224/275 |
| 2005/0099042 A1* | 5/2005 | Vitito | B60N 2/4876 297/217.3 |
| 2005/0155998 A1* | 7/2005 | Albert | A45C 11/24 224/275 |
| 2005/0259523 A1* | 11/2005 | Kang | B60N 2/4876 369/2 |
| 2007/0101372 A1* | 5/2007 | Chang | B60R 11/0235 725/75 |
| 2008/0024463 A1* | 1/2008 | Pryor | B60K 35/00 345/175 |
| 2009/0085383 A1* | 4/2009 | Hicks | B60K 35/00 297/217.3 |
| 2012/0018471 A1* | 1/2012 | Guillermo | B60R 11/0235 224/275 |
| 2013/0256478 A1* | 10/2013 | Reda | B60R 11/02 248/205.1 |
| 2014/0077539 A1* | 3/2014 | Brawner | B60R 11/02 297/217.3 |
| 2017/0008434 A1* | 1/2017 | Chang | B60N 2/4876 |
| 2017/0021931 A1* | 1/2017 | Stephens | B64D 11/0638 |
| 2017/0120840 A1* | 5/2017 | Harris | B60R 11/02 |

* cited by examiner

VEHICLE-MOUNTED ELECTRONIC APPARATUS

BACKGROUND

1. Technical Field

The present disclosure relates generally to a vehicle-mounted electronic apparatus, and more particularly to a vehicle-mounted electronic apparatus having a containing groove formed on a back surface for containing a remote control.

2. Description of Related Art

With the development of electronic products, more and more vehicle owners install vehicle-mounted electronic products in their vehicles. Accordingly, the vehicle-mounted electronic products can provide entertaining and enjoyable services during a vehicle ride.

However, the vehicle-mounted electronic product is generally controlled via a remote control by the user. The remote control is arbitrarily put in different locations in the vehicle after being used to operate the vehicle-mounted electronic product. Hence, it is troublesome to find the remote control once the remote control is left in inconspicuous places and inconvenient to store the remote control in a narrow space in the vehicle.

SUMMARY

An objective of the present disclosure is to provide a vehicle-mounted electronic apparatus to solve the storage problem of a remote control of the vehicle-mounted electronic apparatus.

In order to achieve the above-mentioned objective, the vehicle-mounted electronic apparatus includes a holder, a casing, and a remote control. The holder is disposed on a vehicle seat. The casing is connected to the holder and has a back surface and a side surface, a containing groove, at least one through hole, and at least one magnet. The containing groove is formed on the back surface and adjacent to the side surface, and the containing groove has an inner wall surface. The at least one through hole is formed on the inner wall surface. The at least one magnet is disposed in the casing, is adjacent to the containing groove, and is exposed from the at least one through hole. The remote control is contained in the containing groove and has a side wall and at least one magnetic element disposed on the side wall; wherein the at least one magnetic element is magnetically attracted by the at least one magnet.

Accordingly, the vehicle-mounted electronic apparatus provides the following advantages:

1. The containing groove is used to conveniently contain the remote control with less occupied space.
2. The displacement-limiting parts are used to prevent the remote control being disengaged from the back surface of the casing.
3. The magnets and the corresponding magnetic elements are used to fix the remote control in the containing groove.
4. The buffering element is used to prevent wear between the remote control and the containing groove and firmly fix the remote control in the containing groove.

It is to be understood that both the foregoing general description and the following detailed description are exemplary, and are intended to provide further explanation of the present disclosure as claimed. Other advantages and features of the present disclosure will be apparent from the following description, drawings and claims.

BRIEF DESCRIPTION OF DRAWINGS

The features of the present disclosure believed to be novel are set forth with particularity in the appended claims. The present disclosure itself, however, may be best understood by reference to the following detailed description of the present disclosure, which describes an exemplary embodiment of the present disclosure, taken in conjunction with the accompanying drawings, in which:

DETAILED DESCRIPTION

Figure 1:
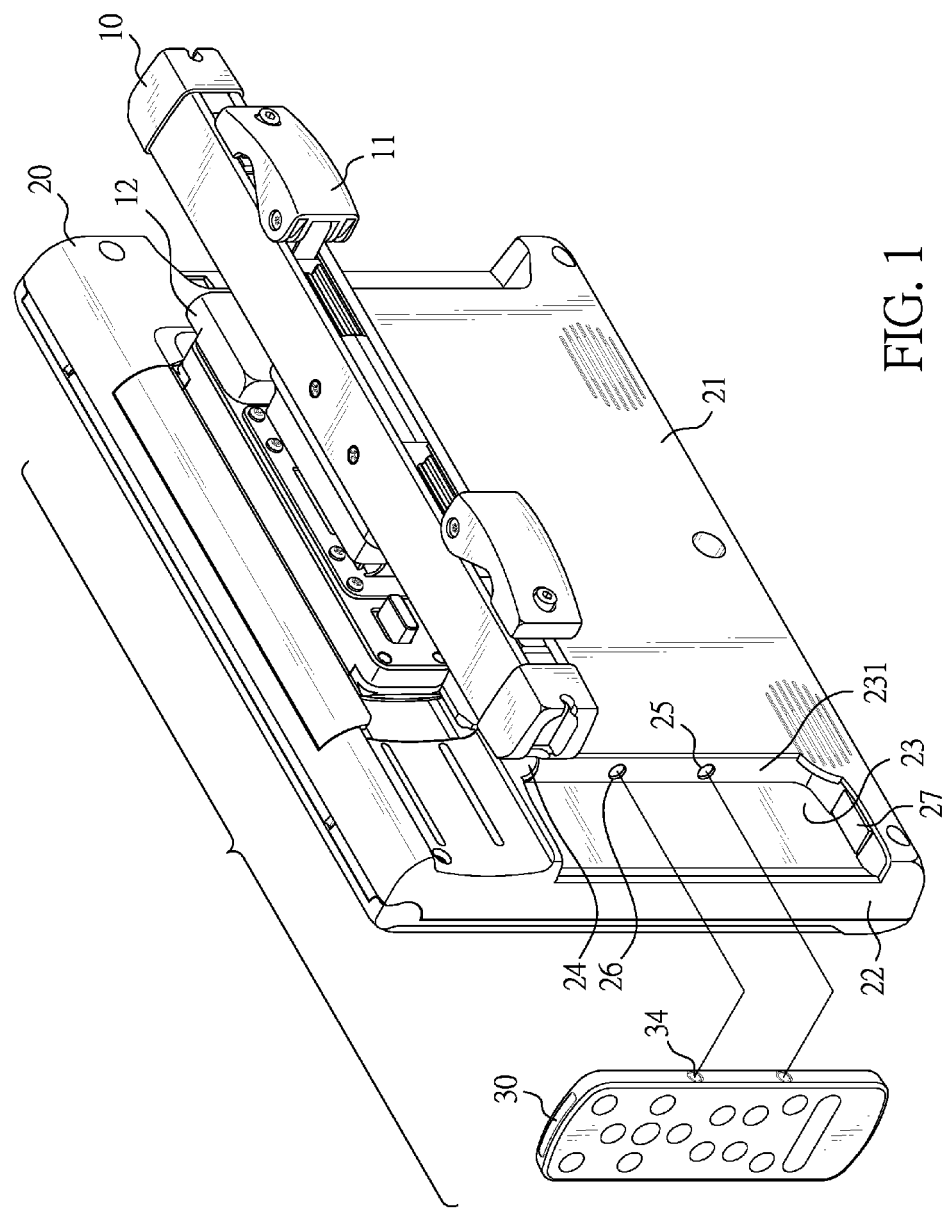
FIG. 1 is a schematic exploded view of a vehicle-mounted electronic apparatus according to the present disclosure.

Reference will now be made to the drawing figures to describe the present disclosure in detail.

Figure 2:
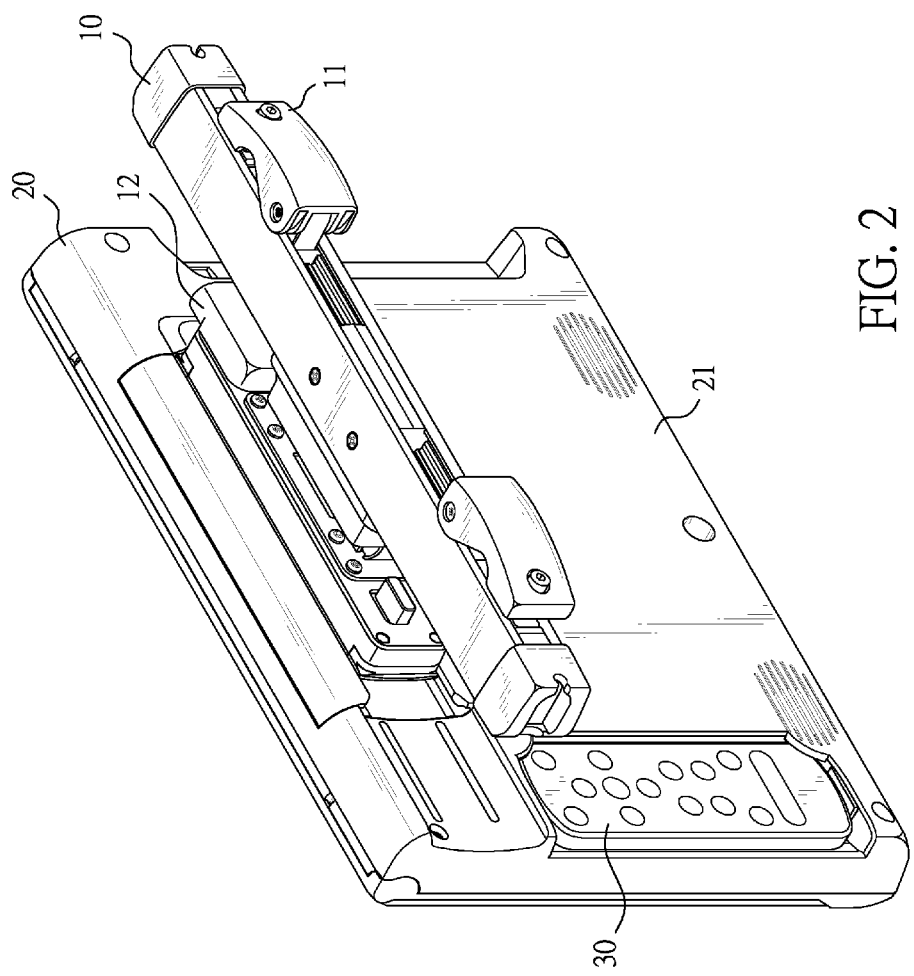
FIG. 2 is a schematic perspective view of the vehicle-mounted electronic apparatus according to the present disclosure.

As shown in FIG. 1 and FIG. 2, a vehicle-mounted electronic apparatus of the present disclosure includes a holder 10, a casing 20, and a remote control 30. The holder 10 has two clamping arms 11 and a connecting part 12, and the two clamping arms 11 and the connecting part 12 are disposed on two side surfaces of the holder 10, respectively. The two clamping arms 11 are separately disposed on two ends of the holder 10. Also, the two clamping arms 11 are used to correspondingly clamp two connecting elements between a backrest and a headrest of a vehicle seat so that the holder 10 is fixed on the vehicle seat. The connecting part 12 has two ends, wherein one end of the connecting part 12 is connected to the holder 10 and the other end of the connecting part 12 is connected to the casing 20.

The casing 20 is connected to the holder 10 by the connecting part 12. The casing 20 is square-shaped and has a back surface 21 and a side surface 22. A containing groove 23 is rectangular, and is formed on the back surface 21 and adjacent to the side surface 22 for containing the remote control 30. In the embodiment shown in FIG. 1, the containing groove 23 is formed adjacent to, but not limited to, a left side surface of the casing 20.

The casing 20 has two displacement-limiting parts 24, wherein the two displacement-limiting parts 24 are arc-shaped and arranged opposite each other. The two displacement-limiting parts 24 laterally extend from an inner wall surface 231 of the containing groove 23 at two inner corners of the containing groove 23. After the remote control 30 is contained in the containing groove 23, the two displacement-limiting parts 24 block the remote control 30, thus preventing the remote control 30 being disengaged from the back surface 21 of the casing 20.

Figure 3:
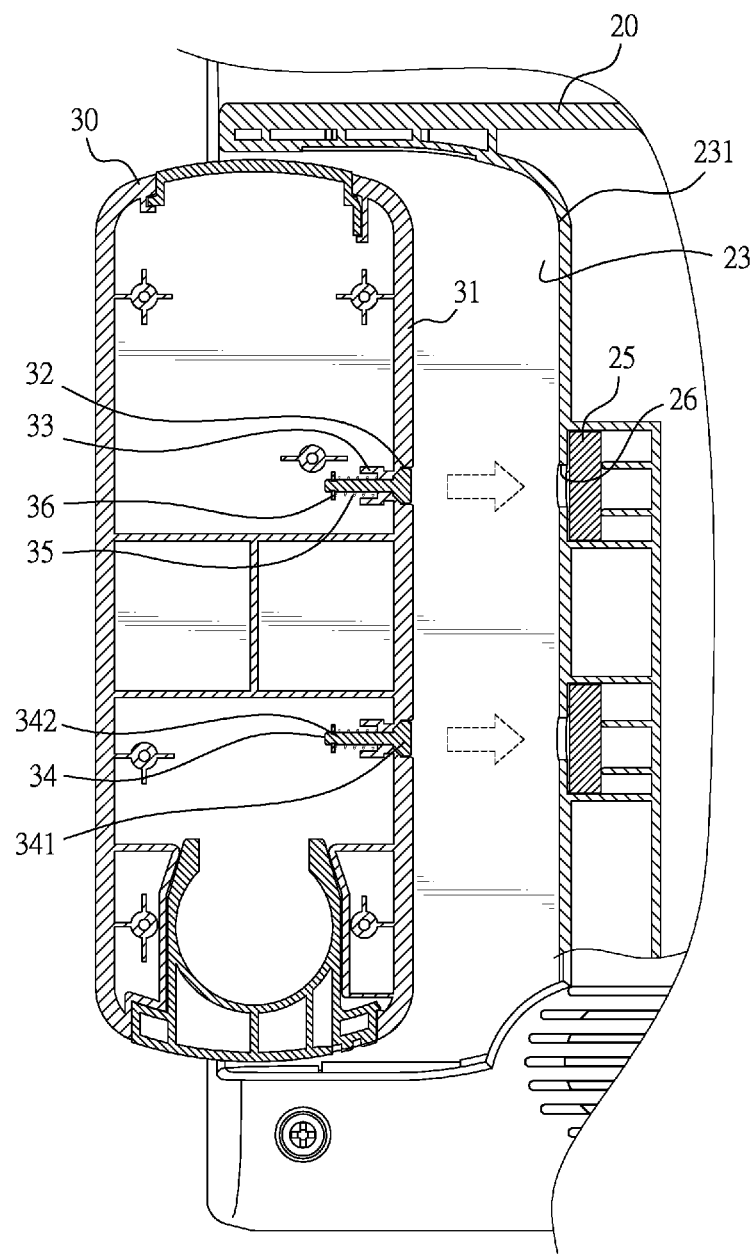
FIG. 3 is a partial cross-sectional view of the vehicle-mounted electronic apparatus according to the present disclosure.

As shown in FIG. 1 and FIG. 3, at least one magnet 25 is disposed in the casing 20. In the embodiment shown in FIG. 1, two through holes 26 are formed on the inner wall surface 231 of the containing groove 23. Also, two magnets 25 are provided to penetrate through the corresponding through holes 26 on the inner wall surface 231 so that the two magnets 25 are exposed from the two through holes 26.

Figure 4:
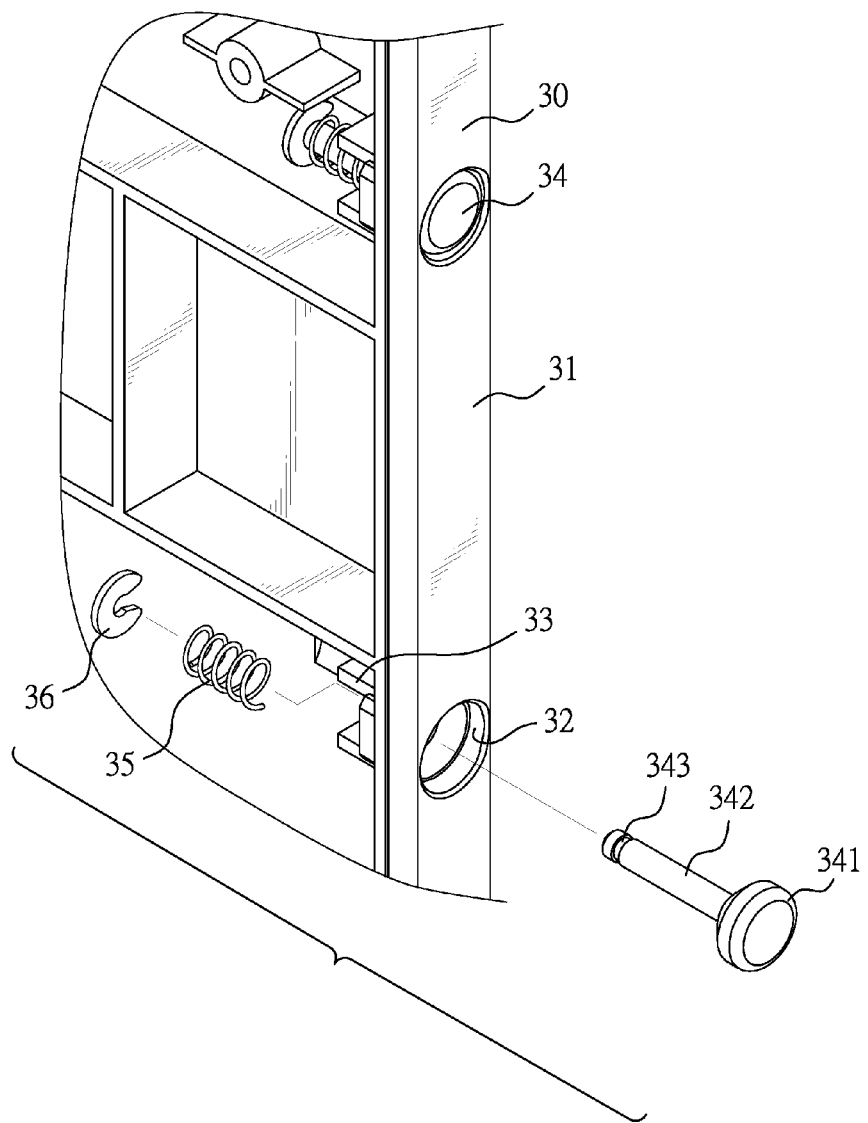
FIG. 4 is a partial schematic exploded view of a remote control according to the present disclosure.

As shown in FIG. 3 and FIG. 4, the remote control 30 has a side wall 31, and at least one containing hole 32 is formed on the side wall 31. Each containing hole 32 has an inner diameter at an interior of the side wall 31 and an outer diameter at an exterior of the side wall 31. In particular, the inner diameter of the containing hole 32 is less than the outer diameter of the containing hole 32. Further, two protrusion elements 33 are formed spaced apart on an inner surface of the side wall 31 and adjacent to the at least one containing hole 32. In addition, a connecting groove (not shown) is formed between the two protrusion elements 33 to communicate with the containing hole. In this embodiment, two containing holes 32 are formed on the side wall 31 and corresponding to the two through holes 26.

In addition, at least one magnetic element 34 is disposed on the side wall 31 of the remote control 30. In this embodiment, two magnetic elements 34 are correspondingly provided to the two magnets 25. The two magnetic elements 34 are disposed in the two containing holes 32, respectively. Each magnetic element 34 has a head part 341 and a shank part 342 connected to a bottom of the head part 341. A concave groove 343 is formed on an end surface of the shank part 342 which is away from the head part 341.

A C-shaped retainer 36 is fixed on the concave groove 343 of the shank part 342. A spring 35 is sleeved on the shank part 342 and one end of the spring 35 is pressed on the C-shaped retainer 36.

Each magnetic element 34 is correspondingly inserted into the containing hole 32 and is movable with respect to the containing hole 32. The head part 341 of the magnetic element 34 is disposed in the corresponding containing hole 32, the shank part 342 and the spring 35 are mounted through the connecting groove, and the C-shaped retainer 36 is disposed out of the connecting groove. The C-shaped retainer 36 moves toward the containing hole 32 to compress the spring 35 when the head part 341 outwardly moves with respect to the containing hole 32. In this embodiment, a diameter of the C-shaped retainer 36 is greater than a hole diameter of the connecting groove so that the C-shaped retainer 36 can be pressed on the two protrusion elements 33, thus preventing the shank part 342 of the magnetic element 34 being disengaged from the containing hole 32. In addition, the head part 341 can be restored to its original position by an elastic force when the spring 35 is released.

Figure 5:
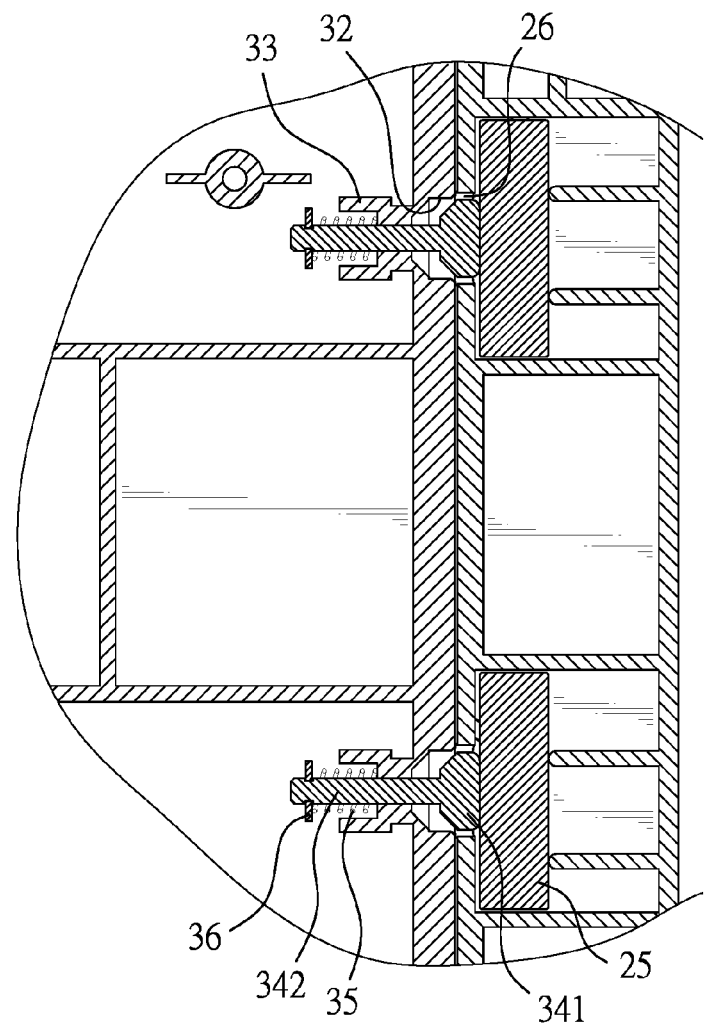
FIG. 5 is a partial cross-sectional view of the remote control according to the present disclosure.

As shown in FIG. 5, the remote control 30 is inserted into the containing groove 23. Also, the remote control 30 is fixed in the containing groove 23 by magnetically attracting the magnets 25 and the magnetic elements 34 to prevent the remote control 30 being disengaged from the containing groove 23 because of vibration or shake on the moving vehicle. When the remote control 30 is inserted into the containing groove 23 and the magnetic elements 34 move closer to the magnets 25, the head parts 341 of the magnetic elements 34 are attracted by the magnets 25. Accordingly, the side wall 31 of the remote control 30 is adjacent to the inner wall surface 231 of the containing groove 23 so as to reduce gaps between the remote control 30 and the containing groove 23 and reduce noise generated from vibration of the remote control 30 and the containing groove 23. In addition, the C-shaped retainer 36 is forced away from the two protrusion elements 33 by the elastic force of the spring 35 when the remote control 30 is drawn from the containing groove 23 so that the head part 341 of the magnetic element 34 is to restore to the containing hole 32, as shown in FIG. 3.

FIG. 1 further shows that a buffering element 27 is disposed on the inner wall surface 231 of the containing groove 23. When the remote control 30 is inserted into or drawn from the containing groove 23, the buffering element 27 is used to reduce friction between the remote control 30 and the containing groove 23, thus preventing wear from the friction. In addition, the buffering element 27 is used to reduce gaps between the remote control 30 and the containing groove 23, thus increasing the effect of fixing the remote control 30 in the containing groove 23. Further, the buffering element 27 is used to prevent wear between the remote control 30 and the containing groove 23 caused by vibration or shake on the moving vehicle.

In conclusion, the present disclosure has the following advantages:

1. The containing groove is used to conveniently contain the remote control with less occupied space.

2. The displacement-limiting parts are used to prevent the remote control being disengaged from the back surface of the casing.

3. The magnets and the corresponding magnetic elements are used to fix the remote control in the containing groove.

4. The buffering element is used to prevent wear between the remote control and the containing groove and firmly fix the remote control in the containing groove.

Although the present disclosure has been described with reference to the preferred embodiment thereof, it will be understood that the present disclosure is not limited to the details thereof. Various substitutions and modifications have been suggested in the foregoing description, and others will occur to those of ordinary skill in the art.

Therefore, all such substitutions and modifications are intended to be embraced within the scope of the present disclosure as defined in the appended claims.

What is claimed is:

1. A vehicle-mounted electronic apparatus comprising: a holder disposed on a headrest of a vehicle seat; a casing connected to the holder, the casing comprising: a back surface and a side surface; a containing groove formed on the back surface and adjacent to the side surface, and the containing groove having an inner wall surface; at least one through hole formed on the inner wall surface; and at least one magnet disposed in the casing, adjacent to the containing groove, and exposed from the at least one through hole; a remote control contained in the containing groove and having a side wall and at least one magnetic element disposed on the side wall; wherein the at least one magnetic element is magnetically attracted by the at least one magnet; and two displacement-limiting parts laterally extending from the inner wall surface of the containing groove at two inner corners of the containing groove and configured to block the remote control.

2. The vehicle-mounted electronic apparatus as claimed in claim 1, wherein each displacement-limiting part is arc-shaped.

3. The vehicle-mounted electronic apparatus as claimed in claim 2, further comprising a buffering element disposed on the inner wall surface of the containing groove.

4. The vehicle-mounted electronic apparatus as claimed in claim 1, wherein the side wall of the remote control has at least one containing hole configured to contain the at least one magnetic element.

5. The vehicle-mounted electronic apparatus as claimed in claim 4, wherein the containing hole has an inner diameter at an interior of the side wall and an outer diameter at an exterior of the side wall, and the inner diameter is less than the outer diameter;

two protrusion elements are formed spaced apart on an inner surface of the side wall and adjacent to the containing hole;

a connecting groove is formed between the two protrusion elements and configured to communicate with the containing hole.

6. The vehicle-mounted electronic apparatus as claimed in claim 5, wherein each magnetic element comprises:

a head part; and a shank part connected to a bottom of the head part; wherein a C-shaped retainer is fixed on a bottom of the shank part and a spring is sleeved on the shank part and one end of the spring is pressed on the C-shaped retainer.

7. The vehicle-mounted electronic apparatus as claimed in claim 6, wherein the head part of each magnetic element is disposed in the containing hole, the shank part and the spring are mounted through the connecting groove, and the C-shaped retainer is disposed out of the connecting groove.

8. The vehicle-mounted electronic apparatus as claimed in claim 4, further comprising a buffering element disposed on the inner wall surface of the containing groove.

9. The vehicle-mounted electronic apparatus as claimed in claim 5, further comprising a buffering element disposed on the inner wall surface of the containing groove.

10. The vehicle-mounted electronic apparatus as claimed in claim 6, further comprising a buffering element disposed on the inner wall surface of the containing groove.

11. The vehicle-mounted electronic apparatus as claimed in claim 7, further comprising a buffering element disposed on the inner wall surface of the containing groove.

12. The vehicle-mounted electronic apparatus as claimed in claim 1, further comprising a buffering element disposed on the inner wall surface of the containing groove.

* * * * *